United States Patent
Koeten et al.

(10) Patent No.: US 9,749,331 B1
(45) Date of Patent: Aug. 29, 2017

(54) CONTEXT BASED CONDITIONAL ACCESS FOR CLOUD SERVICES

(75) Inventors: Robert Koeten, Menlo Park, CA (US); Nicolas Popp, Menlo Park, CA (US)

(73) Assignee: Symantec Corporation, Mountain View, CA (US)

(*) Notice: Subject to any disclaimer, the term of this patent is extended or adjusted under 35 U.S.C. 154(b) by 243 days.

(21) Appl. No.: 13/463,672

(22) Filed: May 3, 2012

Related U.S. Application Data

(60) Provisional application No. 61/482,192, filed on May 3, 2011.

(51) Int. Cl.
G06F 17/00 (2006.01)
H04L 29/06 (2006.01)

(52) U.S. Cl.
CPC ............ H04L 63/102 (2013.01); H04L 63/20 (2013.01)

(58) Field of Classification Search
CPC ......... H04L 63/08; H04L 63/10; H04L 63/20; H04L 63/102; G06F 21/6218
USPC ............................................. 726/1; 713/168
See application file for complete search history.

(56) References Cited

U.S. PATENT DOCUMENTS

| | | | |
|---|---|---|---|
| 7,444,476 B2 | 10/2008 | Gnanasabapathy et al. | |
| 7,734,045 B2 | 6/2010 | Sandhu et al. | |
| 7,836,501 B2 | 11/2010 | Sobel et al. | |
| 7,870,294 B2 | 1/2011 | Braddy et al. | |
| 8,079,066 B1 | 12/2011 | Cordell et al. | |
| 8,091,138 B2 | 1/2012 | Yellepeddy et al. | |
| 8,285,681 B2 | 10/2012 | Prahlad et al. | |
| 8,312,270 B1 | 11/2012 | Chou et al. | |
| 8,544,058 B2 | 9/2013 | Lim | |
| 8,813,174 B1 | 8/2014 | Koeten et al. | |
| 8,819,768 B1 | 8/2014 | Koeten et al. | |
| 9,087,189 B1 | 7/2015 | Koeten et al. | |
| 2004/0039945 A1 | 2/2004 | Oda | |
| 2006/0156385 A1 | 7/2006 | Chiviendacz et al. | |
| 2006/0182276 A1 | 8/2006 | Sandhu et al. | |
| 2007/0088683 A1 | 4/2007 | Feroglia et al. | |
| 2007/0136573 A1* | 6/2007 | Steinberg | 713/155 |
| 2007/0214126 A1 | 9/2007 | Kikinis | |
| 2008/0077982 A1 | 3/2008 | Hayler et al. | |
| 2008/0083025 A1 | 4/2008 | Meijer et al. | |
| 2008/0083040 A1 | 4/2008 | Dani et al. | |
| 2008/0120685 A1 | 5/2008 | Comstock et al. | |
| 2008/0181399 A1 | 7/2008 | Weise et al. | |
| 2008/0222707 A1 | 9/2008 | Pathuri et al. | |
| 2009/0070881 A1* | 3/2009 | Yellepeddy et al. | 726/26 |

(Continued)

OTHER PUBLICATIONS

Imprivata, Inc., Imprivata OneSign® Release 4.1, A Platform Overview, 2008, pp. 1-36.

(Continued)

Primary Examiner — Evans Desrosiers
(74) Attorney, Agent, or Firm — Wilmer Cutler Pickering Hale and Dorr LLP

(57) ABSTRACT

A cloud service access and information gateway receives a first authentication factor for a user in a single sign-on system. The single sign-on system provides access to a plurality of cloud services. The gateway receives, from a user device, a request to access a cloud service of the plurality of cloud services. The gateway compares a context of the request to an access policy for the single sign-on system and grants conditional access to the cloud service based on the access policy.

21 Claims, 7 Drawing Sheets

(56) References Cited

U.S. PATENT DOCUMENTS

| | | |
|---|---|---|
| 2009/0199277 A1* | 8/2009 | Norman ................ H04L 63/105 726/5 |
| 2009/0249439 A1* | 10/2009 | Olden ................ H04L 63/0815 726/1 |
| 2009/0249440 A1* | 10/2009 | Platt .................... H04L 63/0815 726/1 |
| 2009/0300706 A1 | 12/2009 | Ray et al. |
| 2010/0030746 A1 | 2/2010 | Steelberg et al. |
| 2010/0082713 A1 | 4/2010 | Frid-Nielsen et al. |
| 2010/0146583 A1 | 6/2010 | Prehofer et al. |
| 2010/0192196 A1 | 7/2010 | Lee |
| 2010/0202609 A1 | 8/2010 | Sandhu et al. |
| 2011/0113471 A1 | 5/2011 | Hjelm et al. |
| 2011/0196751 A1 | 8/2011 | Steelberg et al. |
| 2011/0209195 A1* | 8/2011 | Kennedy ............................ 726/1 |
| 2011/0231670 A1 | 9/2011 | Shevchenko et al. |
| 2011/0239269 A1 | 9/2011 | Wahl et al. |
| 2012/0023544 A1 | 1/2012 | Li et al. |
| 2012/0023554 A1 | 1/2012 | Murgia et al. |
| 2012/0023556 A1 | 1/2012 | Schultz et al. |
| 2012/0023568 A1 | 1/2012 | Cha et al. |
| 2012/0131336 A1 | 5/2012 | Price et al. |
| 2012/0204221 A1 | 8/2012 | Monjas Llorente et al. |
| 2012/0222084 A1 | 8/2012 | Beaty et al. |
| 2012/0272249 A1 | 10/2012 | Beaty et al. |
| 2012/0297190 A1 | 11/2012 | Shen et al. |

OTHER PUBLICATIONS

Citrix, Thread: Two factor authentication based on source IP address, Oct. 14-15, 2010, http://forums.citrix.com/message.jspa?messageID=1502780.

SonicWall, Inc., SonicWall Aventail, Eclass Secure Remote Access Installation and Administration Guide Version 10.5, Dec. 3, 2009.

Wikipedia, Apple ID, http://en.wikipedia.org/wiki/Apple_ID, retrieved Nov. 2, 2012.

"Check Point Introduces New Line of Security Management Appliance Based on the Software Blade Architecture", May 26, 2009, http://www.checkpoint.com/press/2009/s,art-1052609.html.

USPTO, Office Action for U.S. Appl. No. 13/341,197, mailed Jun. 25, 2013.
USPTO, Office Action for U.S. Appl. No. 13/341,197, mailed Oct. 15, 2013.
USPTO, Office Action for U.S. Appl. No. 13/341,202, mailed Apr. 2, 2013.
USPTO, Office Action for U.S. Appl. No. 13/341,202, mailed Oct. 15, 2013.
USPTO, Office Action for U.S. Appl. No. 13/341,205, mailed Apr. 5, 2013.
USPTO, Office Action for U.S. Appl. No. 13/341,205, mailed Oct. 23, 2013.
USPTO, Office Action for U.S. Appl. No. 13/341,197, mailed Dec. 30, 2013.
USPTO, Office Action for U.S. Appl. No. 13/341,197, mailed Apr. 14, 2014.
USPTO, Office Action for U.S. Appl. No. 13/341,202, mailed Dec. 17, 2013.
USPTO, Notice of Allowance for U.S. Appl. No. 13/341,202, mailed Apr. 10, 2014.
USPTO, Office Action for U.S. Appl. No. 13/341,205, mailed Jan. 3, 2014.
USPTO, Office Action for U.S. Appl. No. 13/463,664, mailed Dec. 4, 2013.
USPTO, Office Action for U.S. Appl. No. 13/341,197, mailed Aug. 6, 2014.
USPTO, Notice of Allowance for U.S. Appl. No. 13/341,205, mailed Apr. 21, 2014.
USPTO, Office Action for U.S. Appl. No. 13/463,664, mailed May 2, 2014.
USPTO, Office Action for U.S. Appl. No. 13/463,664, mailed Sep. 9, 2014.
USPTO, Office Action for U.S. Appl. No. 13/463,664, mailed Jan. 30, 2015.
USPTO, Office Action for U.S. Appl. No. 13/341,197, mailed Nov. 26, 2014.
USPTO, Notice of Allowance for U.S. Appl. No. 13/341,197, mailed Mar. 17, 2015.
USPTO, Office Action for U.S. Appl. No. 13/463,664, mailed Jun. 17, 2015.

* cited by examiner

CONTEXT BASED CONDITIONAL ACCESS FOR CLOUD SERVICES

RELATED APPLICATIONS

This application is related to and claims the benefit of U.S. Provisional Patent Application No. 61/482,192, filed May 3, 2011, which is hereby incorporated by reference herein.

FIELD

Embodiments of the invention relate to cloud service access, and in particular to context based conditional access for cloud services.

BACKGROUND

Certain organizations may offer one or more cloud services to users over a network (e.g., the Internet). The cloud services may include computation, software, data access, storage services, etc. that physically reside elsewhere (e.g., another computer or the organizations data center) which users can access from their own computer or device over the network. Since confidential information may be sent to or received from these cloud services, access policies may limit access to cloud services depending on the user, device, network, etc.

Certain systems may include a single sign on (SSO) solution, that enables a user to access multiple cloud services (e.g., both private cloud services and public cloud services), using a single set of identification credentials. In some cases, however, a user may have multiple accounts for a single cloud service (e.g., a personal account and a corporate account). The multiple accounts may have different access credentials, store different data, etc. The SSO solution may use a password vault to manage the various individual passwords for different cloud services and for different accounts for a single cloud service. Conventionally, the SSO solution may not be able to determine which of the multiple accounts to use for access to a cloud service when a user logs in. Many systems require the user to manually select which account (and the corresponding credentials) they wish to use. This can be a tedious and time consuming task especially if the user has many different accounts.

In addition, certain cloud services may allow access to both public and confidential information. In cases where confidential information is accessed, it may be desirable to require a higher level of security, such as a second authentication factor besides the identification credentials used for the SSO solution. Conventional systems require that the decision of whether to request the second authentication factor or not be set ahead of time in a static configuration regardless of what information is being accessed. This may lead to unnecessary security precautions when only public information is being accessed or to inadequate security for confidential information.

SUMMARY

A method and apparatus for context based conditional access to cloud services is described. In one embodiment, a cloud service access and information gateway receives a first authentication factor for a user in a single sign-on system. The single sign-on system provides access to a plurality of cloud services. The gateway receives, from a user device, a request to access a cloud service of the plurality of cloud services. The gateway compares a context of the request to an access policy for the single sign-on system and grants conditional access to the cloud service based on the access policy. The context of the request may include at least one of an identity of the user, a type of the user device, a type of network over which the request is received, and a type of information requested from the cloud service.

In one embodiment, the cloud service access and information gateway determines whether to request a second authentication factor for the user before granting full access to the cloud service. The second authentication factor may include at least one of a password, a pin, a pattern, a security token, a one-time password, and a biometric. The second authentication factor may be requested in response to a request from the user device for confidential information from the cloud service. Depending on the context of the request, a second factor authentication policy may specify whether to request the second authentication factor.

In another embodiment, the cloud service access and information gateway automatically selects one of a plurality of user accounts for the cloud service and granting access to the cloud service based on the automatically selected user account. The plurality of user accounts may include a personal account and a corporate account, both associated with the user. Depending on the context of the request, an account determination policy may specify which account to select.

In addition, a system for context based conditional access to cloud services is described. An exemplary system may include a processor and a memory coupled with the processor. In one embodiment, the processor is to receive a first authentication factor for a user in a single sign-on system. The processor receives, from a user device, a request to access a cloud service of the plurality of cloud services. The processor compares a context of the request to an access policy for the single sign-on system and grants conditional access to the cloud service based on the access policy.

Further, a computer-readable storage medium for context based conditional access to cloud services is described. An exemplary computer readable storage medium provides instructions, which when executed by a processor causes the processor to perform a method such as the exemplary methods discussed above.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for context based conditional access to cloud services. In one embodiment, a cloud service access and information gateway receives a first authentication factor for a user in a single sign-on system. The single sign-on system provides access to a plurality of cloud services. The gateway receives, from a user device, a request to access a cloud service of the plurality of cloud services. The gateway compares a context of the request to an access policy for the single sign-on system and grants conditional access to the cloud service based on the access policy. The context of the request may include an identity of the user, a type of the user device, a type of network over which the request is received, and/or a type of information requested from the cloud service.

In one embodiment, the conditional access may include requesting a second authentication factor for the user before granting full access to the cloud service based on the context of the request. For example, if the user is requesting confidential information, and the request is sent from a non-managed device or over an unsecure network, the gateway may request the second authentication factor. In another embodiment, the conditional access may include automatically selecting one of a plurality of user accounts for the cloud service based on the context of the request. For example if the user has a personal account and a corporate account, and the request is sent from a corporate managed device, the gateway may automatically select the corporate account for access to the cloud service.

Both of these conditional access decisions may be made dynamically based on the context of the access request. This prevents the need to define static conditions for when to require a second authentication factor or when to use a certain user account. This dynamic system may save time and resources and allow for more efficient and secure access to cloud services.

Figure 1:
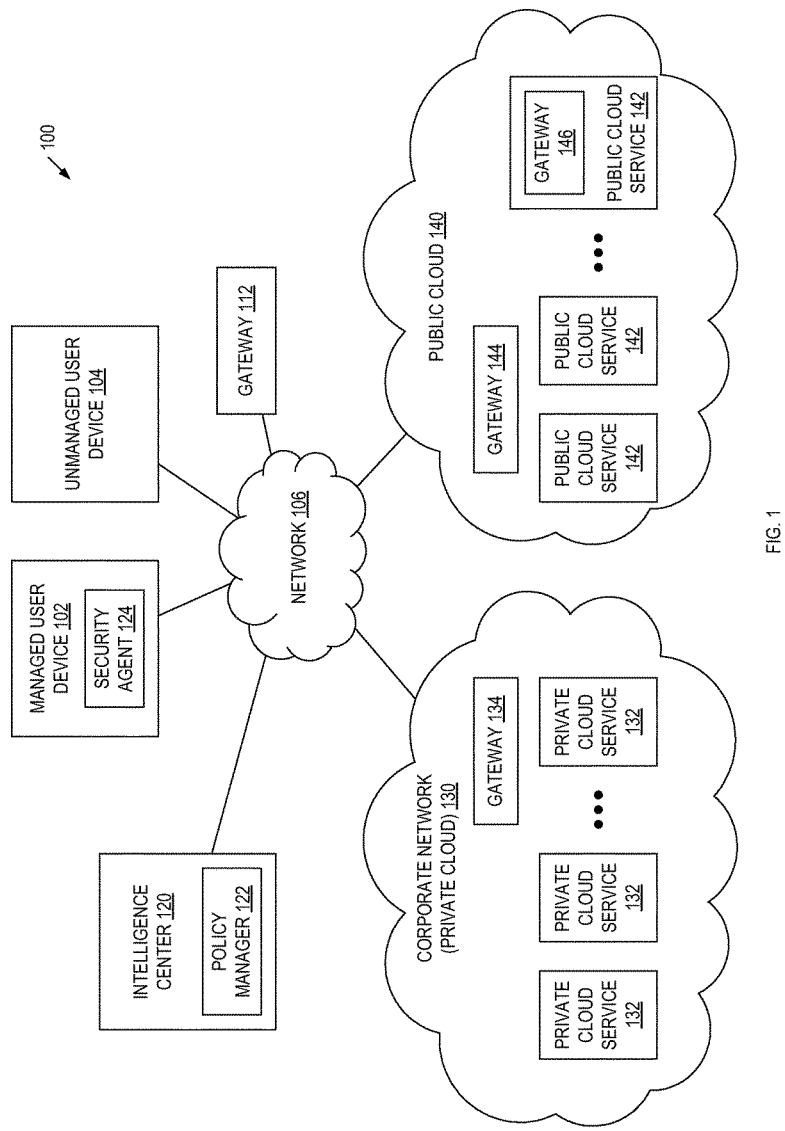
FIG. 1 is a block diagram of an exemplary network architecture, in which embodiments of the present invention may operate.

FIG. 1 is a block diagram of an exemplary network architecture 100, in which embodiments of the present invention may operate. The network architecture 100 may include corporate network (i.e., private cloud) 130, public cloud 140 and one or more user devices 102, 104 capable of communicating with the corporate network 130 and public cloud 140 via a network 106. Network 106 may include, for example, a private network such as a local area network (LAN), a wide area network (WAN), a global area network (GAN) such as the Internet, or a combination of such networks, and may include a wired or wireless network.

The user devices 102, 104 may be portable computing devices such as laptop or tablet computers. Other examples of portable computing devices include cellular telephones (e.g., smartphones), personal digital assistants (PDAs), portable media players, netbooks, and the like. The user devices 102, 104 may also be non-portable computing devices such as desktop computers, set-top boxes associated with a television, gaming consoles, and so on. The user devices 102, 104 may be variously configured with different features to enable access to the various cloud services 132, 142 made available by corporate network 130 and public cloud 140.

In one embodiment, the user devices are categorized as managed user devices 102 and unmanaged user devices 104. Managed user devices 102 may include devices provided by the organization or corporation that manages corporate network 130. For example, if a user is an employee of a corporation, the corporation may provide the employee with a laptop computer and a smartphone. These devices may or may not be owned by the corporation, but as long as the corporation maintains at least an element of control over the devices, they may qualify as managed user devices 102. In some embodiments, the corporation may have control over what applications or programs are installed and run on managed user devices 102. For example, managed user devices 102 may have a security agent 124 installed thereon to monitor data sent to and from the managed user device 102, to encrypt or decrypt data transmissions, identify threats or suspicious behavior, etc. In other embodiments, the corporation may exert other forms of control over managed user devices 102.

Unmanaged user devices 104 include all other user devices that do not qualify as managed user devices 102. Unmanaged user devices 104 may include personal devices owned by the user or employee. For example, unmanaged user devices 104 may include a user's home computer or personal cell phone. Generally, the corporation has no control over what applications and programs are installed and run on unmanaged user devices 104, and unmanaged user devices 104 would not typically include security or data loss prevention software, such as security agent 124. In some embodiments, both managed user devices 102 and unmanaged user devices 104 may be used to access various available cloud services.

Cloud computing may refer to the access of computing resources over a computer network. A common shorthand for a cloud computing service (or an aggregation of all existing cloud services) is "the cloud." Cloud computing allows for a functional separation between the computing resources used and the physical machine where the user is working. The computing resources may reside in a local network or outside the local network, for example, in an internet connected datacenter. A user may access the resources in the cloud (e.g., corporate network 130 or public cloud 140) using a personal computer (PC), workstation, laptop computer, mobile phone, personal digital assistant (PDA), tablet computer or the like, including managed user device 102 and unmanaged user device 104. Using the cloud, any computer connected to the Internet, or other network, may be connected to the same pool of computing power, applications, and files. For example, users can store and access personal files, such as music, pictures, videos, and bookmarks, play games, or use productivity applications and cloud services on a remote server rather than physically carrying around a storage medium such as a DVD or hard drive.

Since the cloud is the underlying delivery mechanism, cloud based applications and services may support any type of software application or service in use today. All of the development and maintenance tasks involved in provisioning the applications are performed by a service provider (e.g., the corporation). The user's computer may contain very little software or data (perhaps a minimal operating system and web browser only), serving as little more than a display terminal for processes occurring on a network of computers, potentially located far away. Cloud computing frees users from certain hardware and software installation and maintenance tasks through the use of simpler hardware that accesses a vast network of computing resources (processors, servers, data storage devices, etc.). The sharing of resources reduces the cost to individuals and users may routinely use data intensive applications and services driven by cloud technology which were previously unavailable due to cost and deployment complexity.

Corporate network 130 and public cloud 140 may each include a group of networked computing resources accessible to the user devices 102, 104 over network 106. The resources available in corporate network 130 and public cloud 140 may include, for example, processing devices, storage devices, applications, or other resources. In one embodiment corporate network 130 may be a private cloud that is operated solely for a single organization, such as a corporation. Corporate network 130 may be managed internally by the corporation or by a third-party, and may be hosted internally or externally. Public cloud 140 may represent cloud computing in the more traditional sense, where resources are dynamically provisioned to the general public on a fine-grained, self service basis. Public cloud 140 may provide services and resources from a variety of service providers and may be jointly managed by the providers or managed by a third-party.

In one embodiment, corporate network 130 may include one or more private cloud services 132. Private cloud services 132 may include applications or programs made available to users of user devices 102, 104. Private cloud services 132 may include services created by the organization that manages corporate network 130 (e.g., the corporation) and/or services created by a third party, but provided and managed by the corporation for its users (e.g., employees). Private cloud services 132 may include, for example, an email service, a document management service, a customer relationship management (CRM) service, a video communication service, or some other cloud service. Select users may be afforded access to private cloud services 132 in corporate network 130 using managed user devices 102 or unmanaged user devices 104 over network 106.

In one embodiment, public cloud 140 may include one or more public cloud services 142. Public cloud services 142 may include applications or programs made available to users of user devices 102, 104. Public cloud services 142 may include services created, provided and managed by a variety of different organizations or service providers. Each public cloud service 142 may be used by a user for either personal or business purposes, and some public cloud services 142 may be used for both purposes. Public cloud services 142 may include similar and/or different services as private cloud services 132, such as for example, an email service, a document management service, a social networking service, a customer relationship management (CRM) service, or some other cloud service. When compared to corporate network 130, a larger portion of users (or in one embodiment, all users of the Internet) may be afforded access to public cloud services 142 in public cloud 140 using managed user devices 102 or unmanaged user devices 104.

Network architecture 100 may also be designed with certain security features to protect access to private services and confidential information maintained by an organization. Confidential information may be stored in a structured form such as a database, a spreadsheet, etc., and may include, for example, customer, employee, patient or pricing data. In addition, confidential information may include unstructured data such as design plans, source code, financial reports, human resources reports, customer or patient reports, pricing documentation, corporate mergers and acquisitions documentation, government (e.g. Securities and Exchange Commission) filings, and any other confidential information that requires restricted user access. In one embodiment, the security may be implemented by intelligence center 120, and a series of one or more security gateways 112, 134, 144, 146.

The security and access features may protect confidential information using access policies, which may be controlled by policy manager 122 in intelligence center 120. In one embodiment, intelligence center 120 may be a computing system or a series of computing systems managed, for example, by the organization which manages corporate network 130. In one embodiment, intelligence center 120 may be separate from corporate network 130 as shown, however, in other embodiments, intelligence center 120 may be implemented using computing resources inside corporate network 130. Additional details of one embodiment of policy manager 122 are provided below with respect to FIG. 2.

The design of the security and access features may allow a user or system administrator to define, aggregate and enforce identity, device, information and service centric policies in a uniform, consistent fashion irrespective of whether a user accesses a cloud service with their personal or corporate credentials, from a managed or unmanaged device, from a known or unknown network, or for personal or corporate related purposes. The system 100 may combine a cloud federated single sign-on (SSO) solution with the cloud service access and information gateways 112, 134, 144, 146 and the capability to grant or decline cloud service access and/or information access/transfer/transformation based on an individual's validated identity, device and network context (e.g. managed device through an unknown network), information classification policy context and the cloud service context (e.g. web portal vs. financial management application). The SSO solution may allow a user to log-into the system using a single set of credentials (e.g., username and password) and have access, according to the access policies, to all of private cloud services 132 and public cloud services 142 without individually signing-in to each one.

The cloud service access and information gateways 112, 134, 144, 146 may serve as policy enforcement points to enforce the policies set by policy manager 122. For example, a request to access a cloud service, such as private cloud service 132 or public cloud service 142, may be passed through one of the cloud service access and information gateways. The cloud service access and information gateway may compare the request to the conditions of the applicable policy, and enforce an action based on the result of the comparing. The action may include, for example, allowing the request, denying the request, modifying the request, granting conditional access to the request or some other action. For example depending on the context of the request and the applicable policy, the action may include requesting a second authentication factor, or automatically selecting one of multiple user accounts that the user has associated with the requested cloud service.

In one embodiment, network architecture 100 may include one or more cloud service access and information gateways located at various different locations. For example, cloud service access and information gateway 112 may be connected to or a part of network 106. Communication between the user devices 102, 104 and corporate network 130 and public cloud 140 may be enabled via any communication infrastructure. One example of such an infrastructure includes a combination of a wide area network (WAN) and wireless infrastructure, which allows a user to access the could services. The wireless infrastructure may be provided by one or multiple wireless communications systems. In one embodiment, the wireless communication system may be a wireless fidelity (WiFi) hotspot connected with the network 106. The wireless communication system may also be a wireless carrier system that can be implemented using various data processing equipment, communication towers, etc. Alternatively, or in addition, the wireless carrier system may rely on satellite technology to exchange information with the user devices 102, 104. Cloud service access and information gateway 112 may implemented as part of this infrastructure, such that all communications are able to be intercepted by the gateway 112.

In another embodiment, cloud service access and information gateways may be alternatively or additionally located within corporate network 130, such as gateway 134, and within public cloud 140, such as gateway 144. Since all network traffic passes through one of the gateways, during peak times of high traffic, a bottleneck may form reducing response times. Placing the gateways 134, 144 within corporate network 130 and public cloud 140 respectively, can alleviate this bottleneck, because the amount of traffic passing through each gateway is reduced. Gateway 134 need only handle traffic intended for private cloud services 132 and gateway 144 need only handle traffic intended for public cloud services 142. In another embodiment, gateway 146 may be alternatively or additionally located within a cloud service, such as for example, public could service 142. Additional details of some embodiments of cloud service access and information gateways 112, 134, 144, 146 are provided below with respect to FIG. 3.

Figure 2:
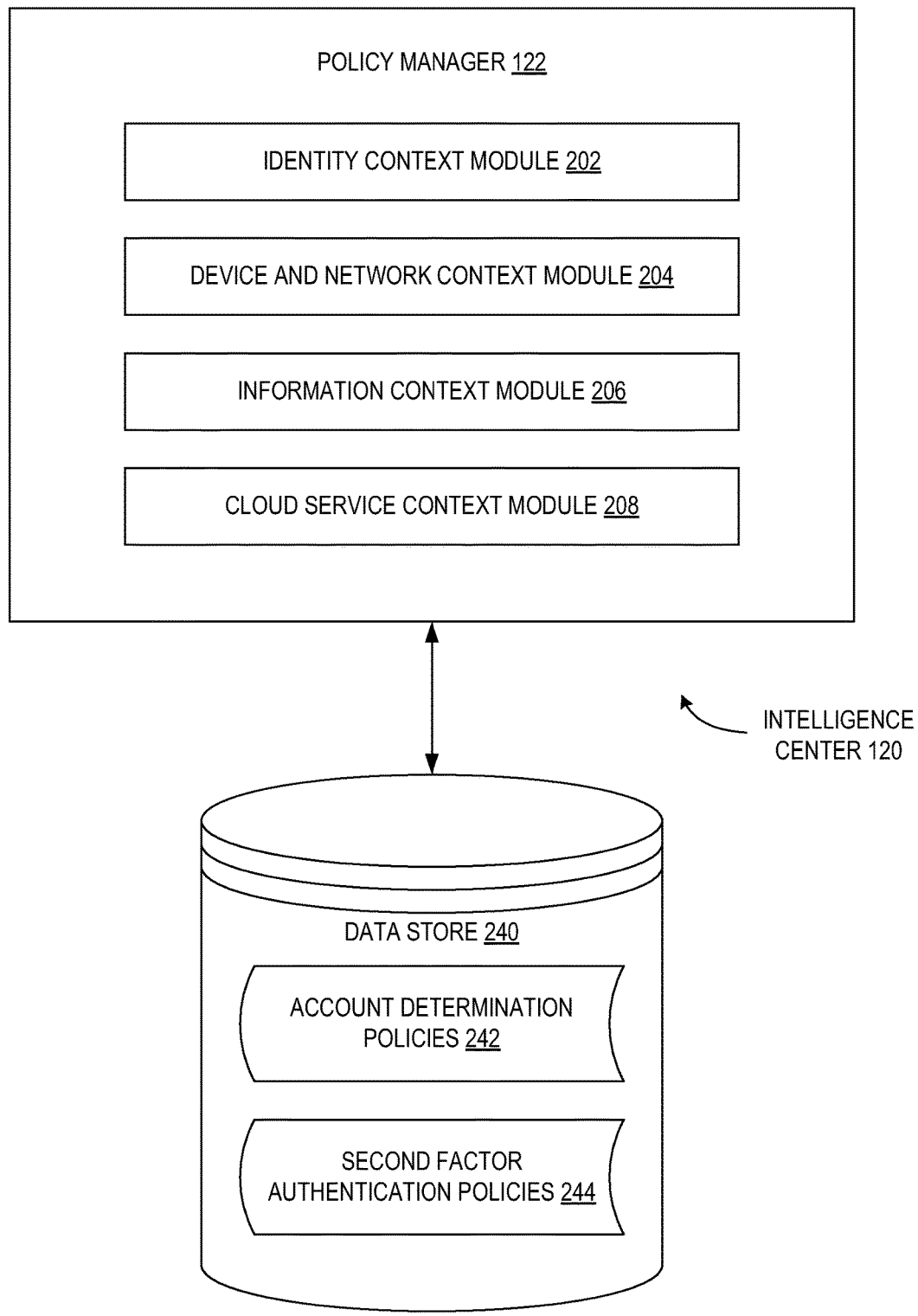
FIG. 2 is a block diagram illustrating an access control policy manager, according to an embodiment.

FIG. 2 is a block diagram of one embodiment of policy manager 122 that is included in intelligence center 120. In one embodiment, policy manager 122 may include identity context module 202, device and network context module 204, information context module 206, and cloud service context module 208. In one embodiment, policy manager 122 is connected to a data store 240, which may be a file system, database or other data management layer resident on a data storage device such as a disk drive, RAM, ROM, database, etc.

Policy manager 122 may be responsible for defining and managing a set of policies defining access to and security for the various cloud services in a network, such as private could services 132 and public could services 142. The resulting policies may be stored in data store 240, for example, as account determination policies 242 and second factor authentication policies 244. The policies 242 and 244 may be specifically defined for certain access requests or indirectly defined based on a number of factors or contexts. For example, a request that has a certain combination of factors, or a certain context, may be treated according to a certain policy. The policies 242 and 244 may be created or defined, for example, by a user, system administrator, or other person or entity.

Identity context module 202 is concerned with the identity of the user making a request to access a cloud service. Regardless of the device used to make the request (e.g., managed user device 102 or unmanaged user device 104), a user may identify himself using login credentials. The login credentials may include, for example, a user name and password. In one embodiment, the login credentials are part of a single sign-on (SSO) system. SSO is a property of access control of multiple related, but independent software systems (e.g., private cloud services 132 and public cloud services 142). With SSO, the user logs in once and gains access to all (or a certain subset) of the services without being prompted to log in again at each of them. As different services may support different authentication mechanisms, SSO may internally translate and store different credentials compared to what is used for the initial SSO login.

In one embodiment, the login credentials provided by the user may vary depending on his status. For example, the user may have a certain user name or login if he is a member of a first group, such as being an employee of the corporation that manages corporate network 130. If the user is not a member of the first group, he may have a different set of login credentials, identifying him as such. In addition, the login credentials may provide other information about the user, such as rank, title, position, or other information. Identity context module 202 may interpret different forms of login information to determine the associated identity of a user with those login credentials, and define a corresponding policy. For example, in one embodiment, only users who are employees of the corporation may be allowed to access private cloud services 132, while non-employees are denied access or are required to provide a second authentication factor before access is granted.

Device and network context module 204 is concerned with the type of device and network from which a request to access a cloud service is made. As discussed above, user devices may be categorized as managed user devices 102 or unmanaged user devices 104. The corporation, or other organization, may have some element of control over managed user device 102, such as requiring that some security software be installed on the managed user device 102, such as security agent 124. Security agent 124 may ensure that the information transferred to and from managed user device 102 is safe and secure. Thus, in one embodiment, device and network context module 204 may define a policy that allows any communication from a managed user device 102 to private cloud services 132. Requests to access cloud services from an unmanaged user device 104 may be denied, according to the policy. In another embodiment, the policy may dictate that such requests from unmanaged user devices 104 be provided access to a cloud service under the user's personal account rather than a corporate account.

The network 106 through which the request to access a cloud service is made may also be considered by device and network context module 204. Network 106, may be for example, a secured or unsecured LAN, a WAN, a mobile telecommunications network, or some other network. Device and network context module 204 may define certain access policies 242 and 244 based on the type of network as well. For example, only requests from secure networks may be granted access to private cloud services 132. In another embodiment, the location of the network may also be considered when defining the policy. For example, a request made over a wireless network in the United States may be allowed access to certain cloud services, while a request made over a wireless network in Europe may only be granted for a different set of cloud services.

Information context module 206 is concerned with the type of information which is requested to or sent from a cloud service. The information may be classified in any number of different ways, such as corporate or personal, confidential or public, critical or non-critical, etc. Information context module 206 may define certain access policies 242 and 244 based on the type of information being communicated. Each of the different contexts, including the information context, may be combined with one or more other contexts when defining the policies 242 and 244. In one embodiment, with respect to the information context, second factor authentication policy 244 may request a second authentication factor when confidential information is requested by an unmanaged user device 104.

Cloud service context module 208 is concerned with the type of cloud service for which access is requested. As discussed above, cloud services may be categorized as private cloud services 132 or public cloud services 142. Private cloud services 132 may include services created by the organization that manages corporate network 130 (e.g., the corporation) and/or services created by a third party, but provided and managed by the corporation for its users (e.g., employees). Public cloud services 142 may include services created, provided and managed by a variety of different organizations or service providers. The cloud service context may also be affected by the type of service requests (e.g., read, write, delete) as well as a service subdomain (e.g., the scope of the requested information) as determined by a more granular URL or URI. The policies 242 and 244 may allow access to the different cloud services based on any combination of one or more of the other contexts. For example, a policy may only allow access to private cloud services 132 from a managed user device 102 or over a secured network. One of skill in the art would recognize that there are many other possible combinations that could form the policies beyond those described herein.

In one embodiment, policy manager 122 creates and manages the policies, such as account determination policies 242 and second factor authentication policies 244 and distributes them to the policy enforcement points (e.g., gateways 112, 134, 144, 146). The policies may be sent to the enforcement points periodically, according to a predefined schedule, each time a change or update is made to one of the policies 242, 244, or in response to a request from a user or system administrator. This may ensure that the gateways 112, 134, 144, 146 are able to make access decisions based on the most recent up-to-date policies.

Figure 3:
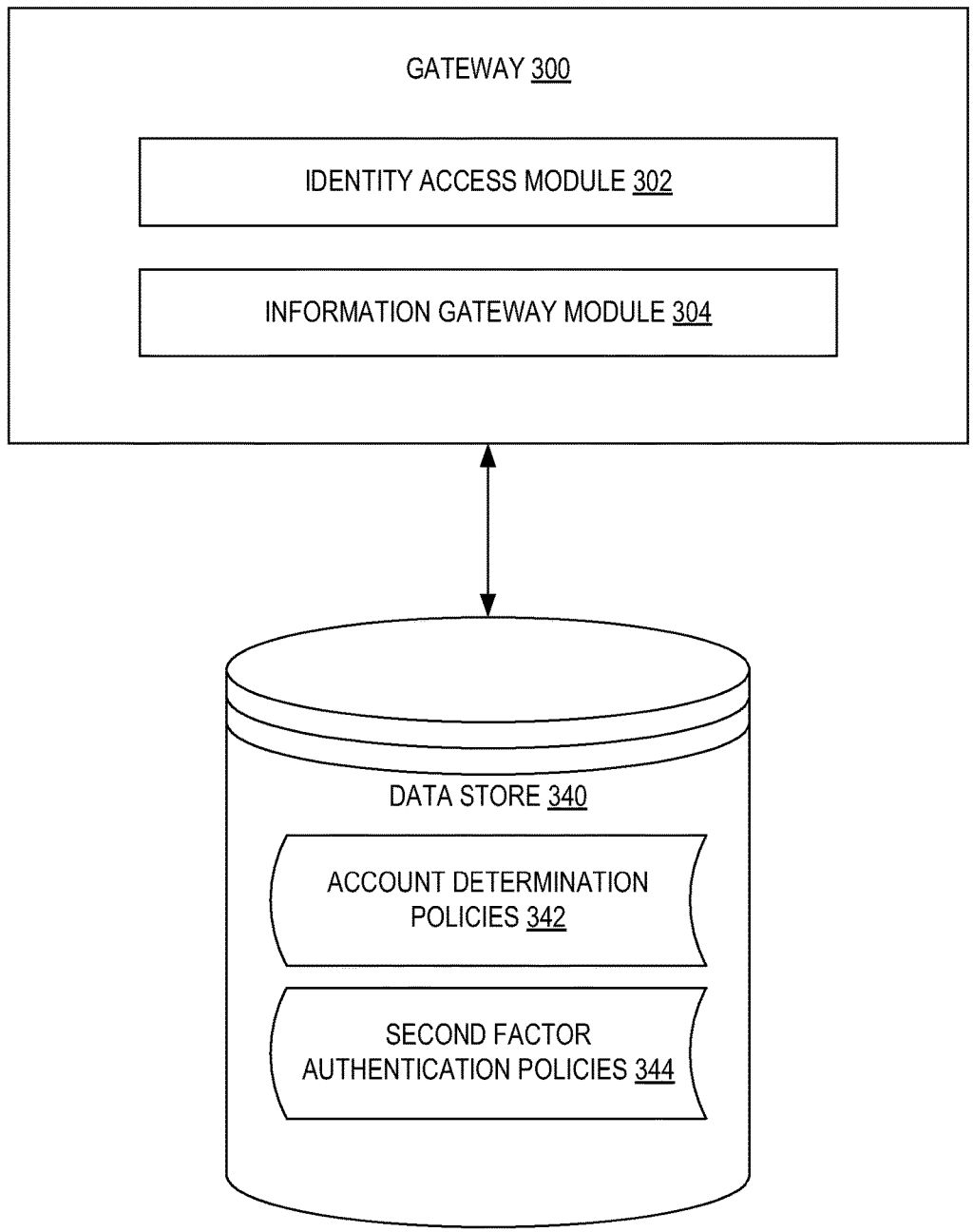
FIG. 3 is a block diagram illustrating a cloud service access and information gateway, according to an embodiment.

FIG. 3 is a block diagram illustrating a cloud service access and information gateway, according to an embodiment of the present invention. In one embodiment, gateway 300 may include identity access module 302 and cloud service access and information gateway module 304. Gateway 300 may be representative of any of cloud service access and information gateways 112, 134, 144, 146, as shown in FIG. 1, and may be located, for example, in network 106, corporate network 130, public cloud 140, in a cloud service, such as public cloud service 142, or elsewhere. In one embodiment, gateway 300 is connected to a data store 340, which may be a file system, database or other data management layer resident on a data storage device such as a disk drive, RAM, ROM, database, etc.

In one embodiment, gateway 300 may intercept or otherwise receive an access request. The request may be sent, for example, by managed user device 102 or unmanaged user device 104 to access a cloud service, such as private cloud service 132 or public cloud service 142. In one embodiment, the request may include information about the request, such as an identity of the user making the request, information about the device and network from which the request was made, including security information from the user device, a type of information being transmitted or requested, an indication of the cloud service to which the request is directed, and/or other information. Gateway 300 may use this information to make an access determination according to one or more access policies, such as account determination policies 342 or second factor authentication policies 344, which may be stored in data store 340. The policies 342 and 344 may be generated and distributed by a policy manager, such as policy manager 122 in intelligence center 120.

Upon receiving the access request, identity access module 302 examines the request and determines which of account determination policies 342 and second factor authentication policies 344 are applicable. In one embodiment, identity access module 302 identifies an identity of the user making the request, information about the device from which the request was made, including security information from the user device and information about the network on which the request was received. In response, identity access module 302 may determine if the request should be allowed for a given cloud service according to the policies 342 and 344. For example, identity access module 302 may determine that the request is received from an employee of the corporation, on a managed device, such as managed user device 102, and received on a secure wireless network 106. The policy 342 may dictate that a request with that particular combination of features should be allowed by either private cloud service 132 or public cloud services 142 using a corporate account, rather than a personal account, since it is most likely that the user will be using the cloud service for business purposes. In one embodiment, the policy 342 may specify individual cloud services that may or may not be accessed, rather than just a class of services. In another embodiment, the user may have the option to manually override the automatic account determination based on policy 342 to switch to a different account associated with the same user.

In one embodiment, either before or after, or in some cases at the same time that identity access module 302 verifies the identity of the request, cloud service access and information gateway module 304 may examine the request and make a determination of whether to allow the request based on policies 342 and 344. Cloud service access and information gateway module 304 may identify a type of information that the access request is either sending to a cloud service or requesting from the cloud service. The information may be classified in any number of different ways, such as corporate or personal, confidential or public, critical or non-critical, etc. For example, cloud service access and information gateway module 304 may determine that the user is attempting to download corporate sales data from a private cloud service 132. In one embodiment, the policy 344 may specify that that a second authentication factor is required to access that information. The system may query the user for a second authentication factor, such as a password, a pin, a pattern, a security token, a one-time password, or a biometric. If this second authentication factor matches the factor specified by the policy, access may be granted to the cloud service.

Figure 4:
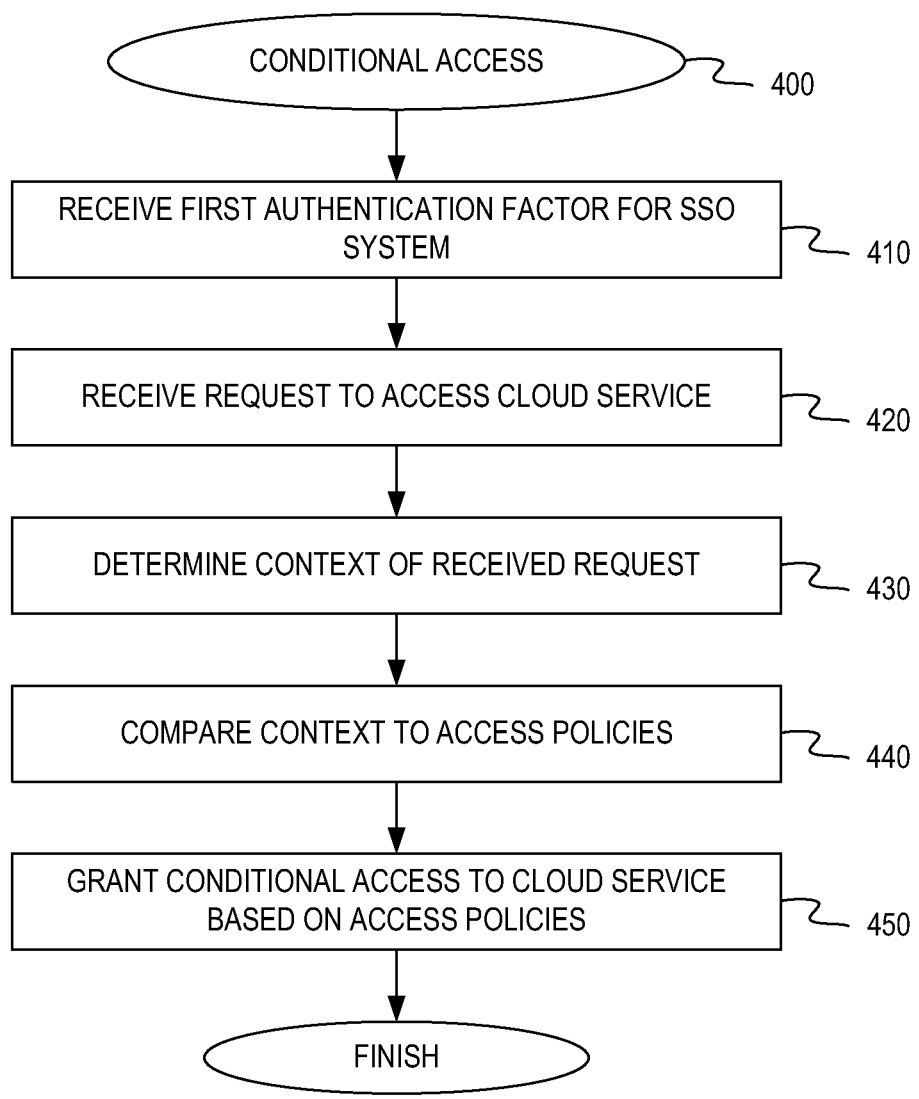
FIG. 4 is a flow diagram illustrating a method for context based conditional access to cloud services, according to an embodiment.

FIG. 4 is a flow diagram illustrating a method for context based conditional access to cloud services, according to an embodiment of the present invention. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud services made by user devices and grant conditional access to the cloud services based on a context of the request. In one embodiment, method 400 may be performed by cloud service access and information gateway 300, as shown in FIG. 3.

Referring to FIG. 4, at block 410, method 400 receives a first authentication factor for a user in a single sign-on (SSO) system. The SSO system may enable a user to access multiple cloud services (e.g., both private cloud services and public cloud services), using a single set of identification credentials. This prevents the user from having to individually log in to each separate cloud service. This first authentication factor may include, for example, a username and password. At block 420, method 400 receives a request to access a cloud service. In one embodiment, the request may be sent by a user device, such as managed user device 102 or unmanaged user device 104. The request may be for access to a cloud service, such as private cloud services 132 or public cloud services 142. In one embodiment, cloud service access and information gateway 300, which may include for example one of gateways 112, 134, 144 or 146, may intercept or otherwise receive the access request.

At block 430, method 400 determines a context of the received request. In one embodiment, identity access module 302 of gateway 300 identifies an identity of the user making the request, information about the device from which the request was made and information about the network on which the request was received. For example, the user may be in a certain class (e.g., an employee) or a member of a certain group, the device may be a managed user device 102 or an unmanaged user device 104, and the network may be a secure private network or a public network. In addition, cloud service access and information gateway module 304 may identify a type of information that the access request is either sending to a cloud service or requesting from the cloud service. The information may be classified in any number of different ways, such as corporate or personal, confidential or public, critical or non-critical, etc. Together, these different features make up the context of the request. In other embodiments, the context may take into account additional features not described herein.

At block 440, method 400 compares the context of the request to one or more access policies for the SSO system. For example, identity access module 302 may determine if the request should be allowed for a given cloud service according to the policies 342 and 344. At block 450, method 400 grants conditional access to the cloud services based on the one or more access policies 450. In one embodiment, the policy 342 may specify that for a request with a particular combination of features, access should be granted to the cloud service using an automatically selected user account. In another embodiment, the policy 344 may specify that a request in another context should require a second authentication factor before access is granted. These conditions imposed by the policies 342 and 344 make up the conditional access afforded by the gateway 300.

Figure 5:
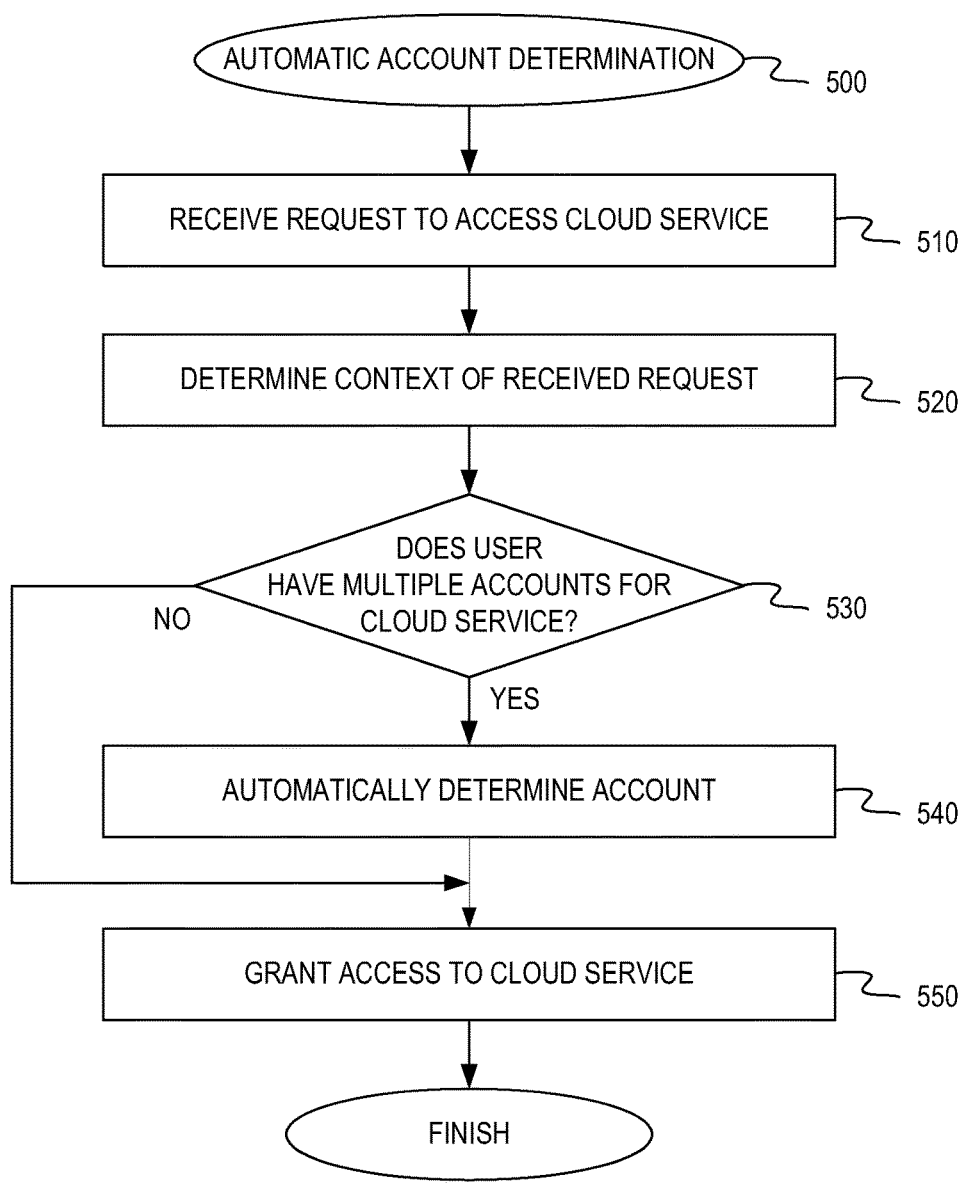
FIG. 5 is a flow diagram illustrating a method for automatically determining a user account for a cloud service, according to an embodiment.

FIG. 5 is a flow diagram illustrating a method for automatically determining a user account for a cloud service, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to automatically select one of multiple user accounts for a cloud service based on a context of an access request. In one embodiment, method 500 may be performed by cloud service access and information gateway 300, as shown in FIG. 3.

Referring to FIG. 5, at block 510, method 500 receives a request to access a cloud service. At block 520, method 500 determines a context of the received request, as described above.

At block 530, method 500 determines if the user has multiple accounts for the requested cloud service. For example, for a given cloud service, a user may have multiple different accounts, including for example, a personal account, a corporate account, a shared family account, etc. Each of these different accounts may be associated with the user through the SSO system. In one embodiment, the SSO system may maintain a password vault storing the specific access credentials for the cloud service for each of the different user accounts. Identify access module 302 may examine this password vault, which may include a database or other data structure, to determine if more than one user account exists.

If at block 530, method 500 determines that the user has multiple accounts for the cloud service, at block 540, method 500 automatically determines or selects one of the accounts based, for example, on the context of the request and account determination policies 342. For example, if the context of the request includes a corporate device or a corporate network, the policy 342 may specify that a corporate user account should be used. If the context of the request includes a personal user device or an unknown network, the policy 342 may specify that a personal user account should be used for access to the cloud service. Any number of different contexts or combinations of contexts may be defined in policy 342.

At block 550, method 500 grants access to the cloud service using the user account determined at block 540. Identify access module 302 may retrieve the corresponding credentials from the password vault and automatically log the user into the cloud service using those credentials. If only one user account exists for this user for the requested cloud service, that access may be granted using that account.

Figure 6:
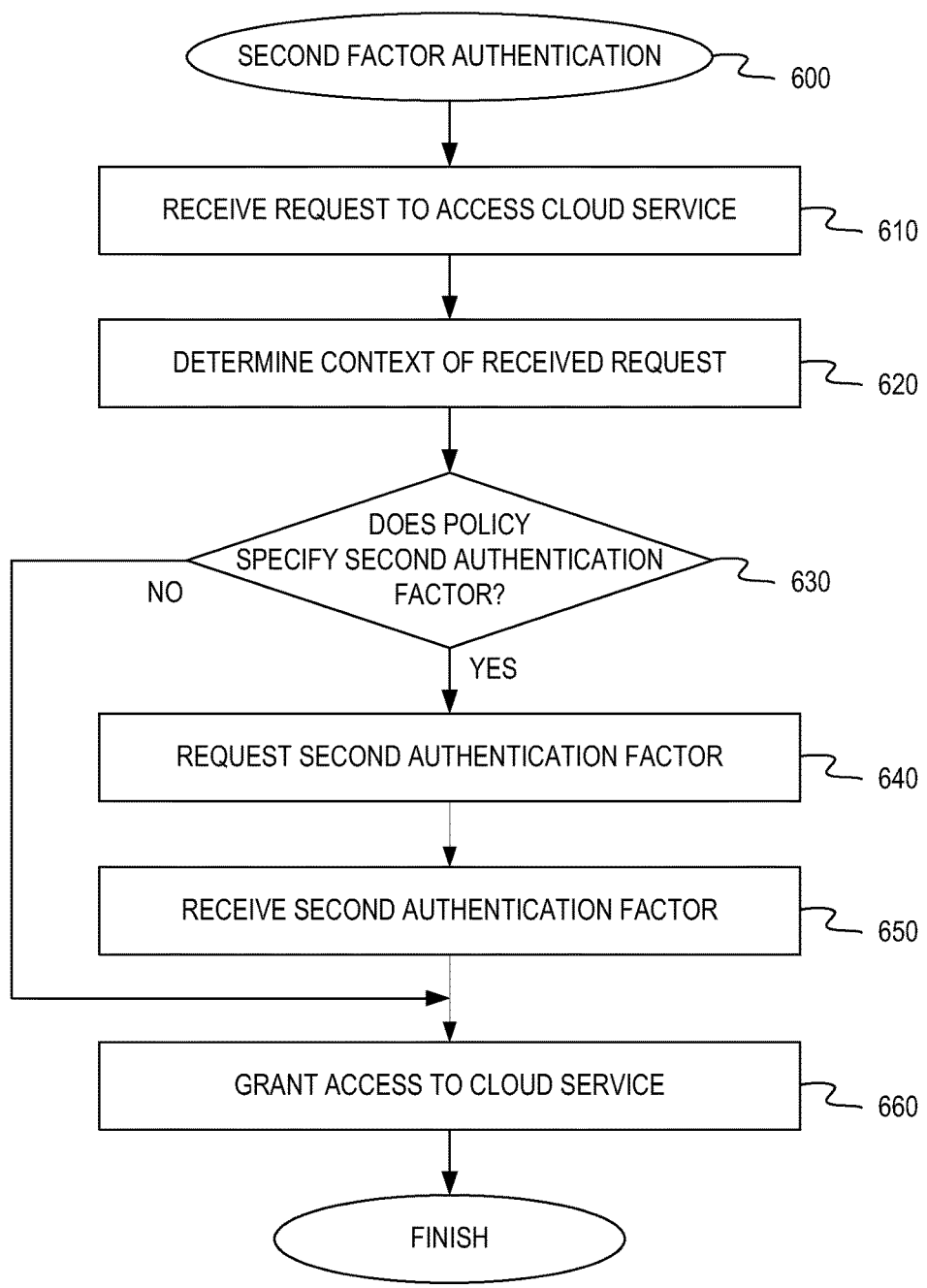
FIG. 6 is a diagram illustrating a method for determining when to request a second authentication factor for access to a cloud service, according to an embodiment.

FIG. 6 is a diagram illustrating a method for determining when to request a second authentication factor for access to a cloud service, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to automatically determine when to request a second authentication factor based on a context of an access request for a cloud service. In one embodiment, method 600 may be performed by cloud service access and information gateway 300, as shown in FIG. 3.

Referring to FIG. 6, at block 610, method 600 receives a request to access a cloud service. At block 620, method 600 determines a context of the received request, as described above.

At block 630, method 600 determines whether the second factor authentication policy 344 specifies a second authentication factor for the context of the received access request. For example, if the user is requesting confidential information from the cloud service, as determined by information gateway module 304, and the context of the request includes a corporate device and/or a corporate network, the second factor authentication policy 344 may specify that a second authentication factor is not needed. However, if the context of the request includes a personal user device or an unknown network, the policy 344 may specify that a second authentication factor should be requested before access is granted to the confidential information. Any number of different contexts or combinations of contexts may be defined in policy 344.

If at block 630, method 600 determines that the policy 344 does specify a second authentication factor, at block 640, method 600 requests the second authentication factor specified by the policy. The second authentication factor may include, for example, a password, a pin, a pattern, a security token, a one-time password, a biometric, or some other authentication factor. In addition, the policy may specify multiple factors or a combination of these or other factors. At block 650, method 600 receives the second authentication factor from the user. At block 660, method 600 grants access to the requested cloud service. If a second authentication factor is not specified in the policy 344, method 600 may directly grant access to the requested cloud service.

Figure 7:
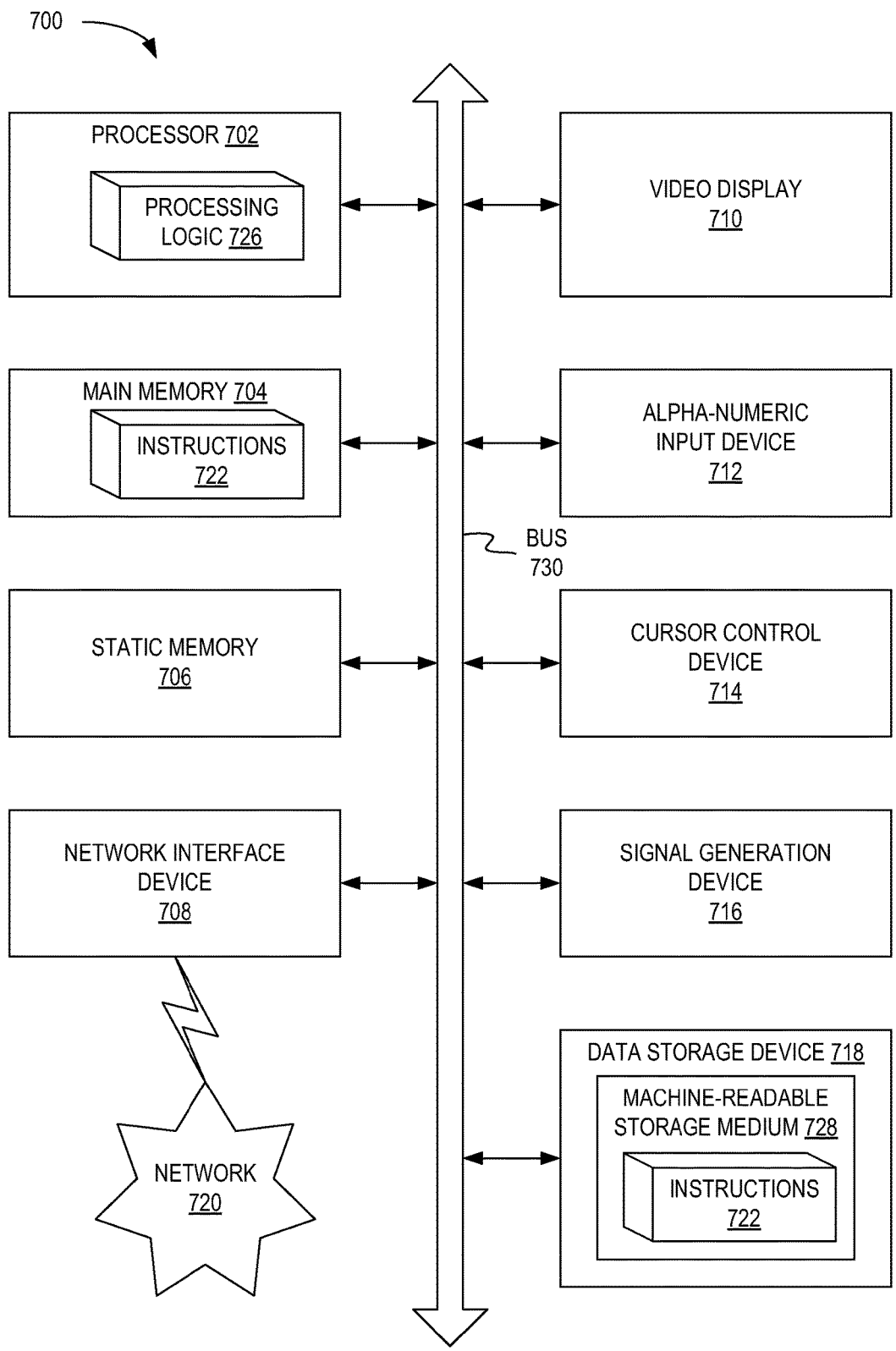
FIG. 7 is a block diagram illustrating one embodiment of a computer system, according to an embodiment.

FIG. 7 illustrates a diagrammatic representation of a machine in the exemplary form of a computer system 700 within which a set of instructions, for causing the machine to perform any one or more of the methodologies discussed herein, may be executed. The system 700 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may represent intelligence center 120 in FIG. 1 and/or gateway 300 in FIG. 3.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 may be configured to execute the cloud service access and information gateway 300 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of gateway 300) embodying any one or more of the methodologies or functions described herein. The instructions 722 may also reside, completely or at least partially, within the main memory 704 and/or within processing logic 726 of the processor 702 during execution thereof by the computer system 700, the main memory 704 and the processor 702 also constituting computer-readable media. The instructions may further be transmitted or received over a network 720 via the network interface device 708.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    receiving a first authentication factor for a user in a single sign-on system, the single sign-on system to provide access to a plurality of cloud services;
    receiving, from a user device over a network, a request to access a cloud service of the plurality of cloud services, the user having a plurality of user accounts for the cloud service, wherein each user account has independent access credentials associated with the account;
    determining a context of the request to include a type of information to be sent to or received from the cloud service as a result of the request;
    comparing, by a processing device, the context of the request to an access policy for the single sign-on system;
    automatically determining a first user account of the plurality of user accounts for the cloud service based on the context of the request and the access policy; and
    granting the user conditional access to the cloud service using the associated access credential for the first user account,
    wherein granting conditional access comprises requesting a second authentication factor for the user before granting full access to the cloud service.

2. The method of claim 1, wherein the second authentication factor comprises at least one of a password, a pin, a pattern, a security token, a one-time password, or a biometric.

3. The method of claim 1, wherein the second authentication factor is requested in response to a request from the user device for confidential information from the cloud service.

4. The method of claim 1, wherein the plurality of user accounts comprises a personal account and a corporate account, both associated with the user.

5. The method of claim 1, wherein the context of the request is further determined to comprise an identity of the user, a type of the user device, a type of network over which the request is received, or a type of information requested from the cloud service.

6. The method of claim 1, wherein a cloud service access and information gateway determines the context of the request and compares the context to the access policy.

7. The method of claim 1, wherein the access policy specifies whether to request a second authentication factor and which of a plurality of user accounts to use based on the context of the request.

8. A system, comprising:
    a memory; and
    a processing device coupled with the memory to:
        receive a first authentication factor for a user in a single sign-on system, the single sign-on system to provide access to a plurality of cloud services;
        receive, from a user device over a network, a request to access a cloud service of the plurality of cloud services, the user having a plurality of user accounts for the cloud service, wherein each user account has independent access credentials associated with the account;
        determine a context of the request to include a type of information to be sent to or received from the cloud service as a result of the request;
        compare the context of the request to an access policy for the single sign-on system; automatically determine a first user account of the plurality of user accounts for the cloud service based on the context of the request and the access policy; and
        grant the user conditional access to the cloud service using the associated access credential for the first user account,
        wherein granting conditional access comprises requesting a second authentication factor for the user before granting full access to the cloud service.

9. The system of claim 8, wherein the second authentication factor comprises at least one of a password, a pin, a pattern, a security token, a one-time password, or a biometric.

10. The system of claim 8, wherein the second authentication factor is requested in response to a request from the user device for confidential information from the cloud service.

11. The system of claim 8, wherein the plurality of user accounts comprises a personal account and a corporate account, both associated with the user.

12. The system of claim 8, wherein the context of the request is further determined to comprise an identity of the user, a type of the user device, a type of network over which the request is received, or a type of information requested from the cloud service.

13. The system of claim 8, wherein a cloud service access and information gateway determines the context of the request and compares the context to the access policy.

14. The system of claim 8, wherein the access policy specifies whether to request a second authentication factor and which of a plurality of user accounts to use based on the context of the request.

15. A non-transitory computer readable storage medium including instructions that, when executed by a processor, cause the processor to perform operations comprising:

receiving a first authentication factor for a user in a single sign-on system, the single sign-on system to provide access to a plurality of cloud services;

receiving, from a user device over a network, a request to access a cloud service of the plurality of cloud services, the user having a plurality of user accounts for the cloud service, wherein each user account has independent access credentials associated with the account;

determining a context of the request to include a type of information to be sent to or received from the cloud service as a result of the request;

comparing, by a processing device, the context of the request to an access policy for the single sign-on system;

automatically determining a first user account of the plurality of user accounts for the cloud service based on the context of the request and the access policy; and granting the user conditional access to the cloud service using the associated access credential for the first user account, wherein granting conditional access comprises requesting a second authentication factor for the user before granting full access to the cloud service.

16. The non-transitory computer readable storage medium of claim 15, wherein the second authentication factor comprises at least one of a password, a pin, a pattern, a security token, a one-time password, or a biometric.

17. The non-transitory computer readable storage medium of claim 15, wherein the second authentication factor is requested in response to a request from the user device for confidential information from the cloud service.

18. The non-transitory computer readable storage medium of claim 15, wherein the plurality of user accounts comprises a personal account and a corporate account, both associated with the user.

19. The non-transitory computer readable storage medium of claim 15, wherein the context of the request is further determined to comprise an identity of the user, a type of the user device, a type of network over which the request is received, or a type of information requested from the cloud service.

20. The non-transitory computer readable storage medium of claim 15, wherein a cloud service access and information gateway determines the context of the request and compares the context to the access policy.

21. The non-transitory computer readable storage medium of claim 15, wherein the access policy specifies whether to request a second authentication factor and which of a plurality of user accounts to use based on the context of the request.

* * * * *